United States Patent [19]

Smith

[11] Patent Number: 4,507,776
[45] Date of Patent: Mar. 26, 1985

[54] NONLINEAR ALL-OPTICAL TIME DIVISION MULTIPLEXER AND DEMULTIPLEXER

[75] Inventor: Peter W. Smith, Colts Neck, N.J.

[73] Assignee: AT&T Bell Laboratories, Murray Hill, N.J.

[21] Appl. No.: 531,500

[22] Filed: Sep. 12, 1983

[51] Int. Cl.³ .............................................. H04B 9/00
[52] U.S. Cl. ................................... 370/4; 350/96.14; 350/354
[58] Field of Search .................... 370/1, 2, 4; 350/353, 350/354, 355, 358, 359, 360, 362, 363, 96.13, 96.14; 455/612

[56] References Cited

U.S. PATENT DOCUMENTS

| | | | |
|---|---|---|---|
| 3,633,034 | 1/1972 | Uchida | 370/3 |
| 3,670,166 | 6/1972 | Kaminow | 370/4 |
| 3,671,747 | 6/1972 | Duguay | 370/2 |
| 3,849,604 | 11/1974 | Benes et al. | 370/1 |
| 4,001,577 | 1/1977 | Albanese et al. | 370/1 |
| 4,206,347 | 6/1980 | Avicola et al. | 350/358 |
| 4,294,508 | 10/1981 | Husbands | 350/96.15 |
| 4,299,488 | 11/1981 | Tomlinson | 356/328 |
| 4,356,395 | 10/1982 | Miller | 250/227 |

FOREIGN PATENT DOCUMENTS

WO83/03506 10/1983 PCT Int'l Appl. ................. 455/612

OTHER PUBLICATIONS

Lean-Integrated Thin Film Digital Switch-IBM Tech. Disclosure Bulletin-vol. 18, No. 10, Mar. 1976, pp. 3482, 3483.
"Experimental Observations of Picosecond Pulse . . . ", *Physical Review Letters*, vol. 45, No. 1, 1980, Mollenauer et al., pp. 1095-1097.
"Optical Devices for Wavelength Division Multiplexing", *Phillips Telecommunication Review*, vol. 40, No. 2, Jul. 1982, Koonen et al., pp. 102-110.
"On The Physical Limits of Digital Optical . . . ", *BSTJ*, vol. 61, No. 8, Oct. 1982, P. W. Smith, pp. 1975-1993.
"Bistability Observed in a Fabry-Perot . . . ", *Applied Physics Letters*, vol. 41, No. 11, Dec. 1982, Wedding et al., pp. 1028-1030.

*Primary Examiner*—Joseph A. Orsino, Jr.
*Attorney, Agent, or Firm*—Erwin W. Pfeifle; Wendy W. Koba

[57] ABSTRACT

The present invention relates to a nonlinear optical time-division multiplexer and demultiplexer formed from a cascaded plurality of triggerable optical switching elements. In accordance with the present invention, an exemplary triggerable optical switching element comprises a nonlinear optical material disposed in, for example, a ring resonator arrangement. The nonlinear optical material exhibits an index of refraction which is a function of the intensity of the light passing therethrough. An exemplary switching element is responsive to two separate optical pulse streams, where neither pulse stream comprises a sufficient intensity to cause the element to switch. A trigger pulse is utilized which comprises a sufficient intensity to stimulate switching the output from a first optical pulse stream to a second optical pulse stream. An external synchronization means may be employed to adjust the arrival of the trigger pulse in the nonlinear material so as to allow the time-division multiplexing or demultiplexing to be achieved.

12 Claims, 5 Drawing Figures

NONLINEAR ALL-OPTICAL TIME DIVISION MULTIPLEXER AND DEMULTIPLEXER

BACKGROUND OF THE INVENTION

1. Field of the Invention

The present invention relates to a nonlinear all-optical time division multiplexer and demultiplexer and, more particularly, to an optical multiplexer and demultiplexer formed from a plurality of triggerable switching elements, each switching element comprising a nonlinear optical material disposed in, for example, a ring resonator structure.

2. Description of the Prior Art

A number of recent developments have increased the interest in digital optical signal processing devices and techniques. Laser technology has now advanced to the point that lasers are being used in consumer electronics. Optical fiber communication systems are being widely installed. In the research stage, it has been shown that optical fibers can be used to transmit information at rates approaching 1 THz, as described in the article "Experimental Observations of Picosecond Pulse Narrowing and Solitons in Optical Fibers" by L. F. Mollenauer et al appearing in *Physical Review Letters*, Vol. 45, No. 1, 1980, at pp. 1095–1097. This rate is much beyond the capabilities of any presently-known electronic light detector. Thus, to utilize this information-handling capacity, some form of optical signal processing will have to be performed before the light signals are converted to electronic ones.

Multiplexing of optical signals onto a single optical fiber has been investigated for over a decade. One exemplary multiplexing arrangement is disclosed in U.S. Pat. No. 3,633,034 issued to T. Uchida et al on Jan. 4, 1969. Here, beams of coherent modulated light which are spatially multiplexed are impinged upon one end of a fibrous converging light guide, each beam having a specific incident angle and position from the axis. This arrangement, therefore, is necessarily limited by the spatial resolution which may be obtained at the entrance to the fiber. The modulated beams are emitted in a spatially multiplexed fashion from the other end of the guide where they are detected.

A scheme which employs time division multiplexing in place of the above-described space-division multiplexing scheme is disclosed in U.S. Pat. No. 3,670,166 issued to I. P. Kaminow on June 13, 1972. In the Kaminow arrangement, time-division multiplexing is achieved by means of a cascaded array of N polarization rotators and associated polarization selective prisms. The N pulse-encoded signals, polarized along a first direction, are coupled bit-by-bit into the respective rotators by means of their associated prisms. The Kaminow arrangement, therefore, requires a large number of dedicated rotators and prisms to achieve a high-capacity system.

Wavelength division multiplexing of optical signals is discussed in the article "Optical Devices for Wavelength Division Multiplexing Systems" by A. M. J. Koonen et al appearing in *Philips Telecommunication Review*, Vol. 40, No. 2, July 1982, at pp. 102–110. As discussed in the article, signals from several optical transmitters, each emitting at a different wavelength, are combined by a device called a wavelength division multiplexer, and are transmitted along a single fiber. In a variation, a wavelength division multiplexer also allows two-way transmission along the same fiber by using different wavelengths in either direction. A WDM system, however, is limited by the number of separate wavelengths capable of being generated by the separate sources.

In light of the above-cited prior art, therefore, there remains a need for an optical multiplexer and demultiplexer capable of operating in a high-capacity optical fiber communication system.

SUMMARY OF THE INVENTION

The problem remaining in the prior art has been solved in accordance with the present invention which relates to an optical time division multiplexer and demultiplexer and, more particularly, to an optical time division multiplexer and demultiplexer formed from a plurality of triggerable switching elements, each switching element comprising a nonlinear optical material disposed in, for example, a ring resonator structure.

It is an aspect of the present invention to employ nonlinear optical devices as multiplexing and demultiplexing elements, where the nonlinear devices are triggered sequentially to allow the multiplexing of different sources onto a single optical channel or demultiplexing of an optical signal into separate output channels.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
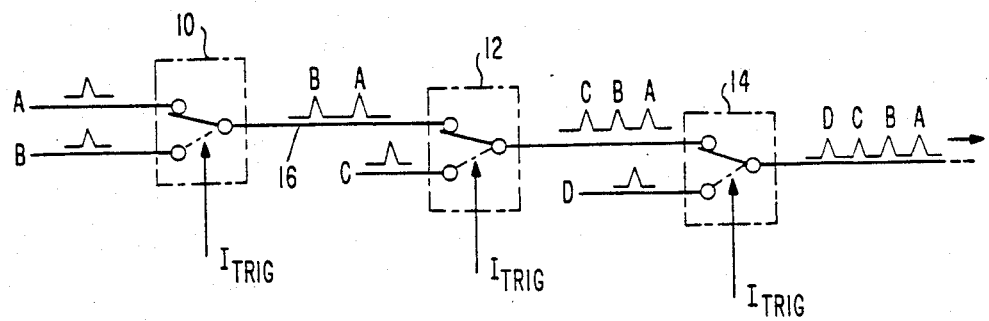
FIG. 1 illustrates the optical time-division multiplexing function of the present invention.

A multiplexer formed in accordance with the present invention may be made from any number of triggerable switching elements, where an exemplary arrangement consisting of three elements is illustrated in FIG. 1. As shown, such a multiplexer comprises three switching elements 10, 12, and 14 which are capable of multiplexing four separate pulse trains labeled A, B, C, and D. In particular, triggerable switching element 10 connects pulses from A and B onto a transmission path 16, when switching element 10 is suitably activated by an optical trigger pulse $I_{trig}$. The pulses from A and B travel along transmission path 16 and are applied as a first input to switching element 12, where the second input to switching element 12 is pulse train C. Like element 10, switching element 12 is activated by a trigger pulse $I_{trig}$, and pulses from A, B and C are multiplexed as shown in FIG. 1 along transmission path 16. Switching element 14 operates in the same manner, multiplexing a pulse from D onto the pulse stream CBA already propagating along transmission path 16. Therefore, the output from an exemplary multiplexer arrangement formed in accordance with the present invention, as shown in FIG. 1, is a pulse train denoted DCBA. It is to be understood that in order for the multiplexing to be accomplished in the correct sequence, the activation of the $I_{trig}$ pulse stream must be controlled by an external clocking means (not shown).

Figure 2:
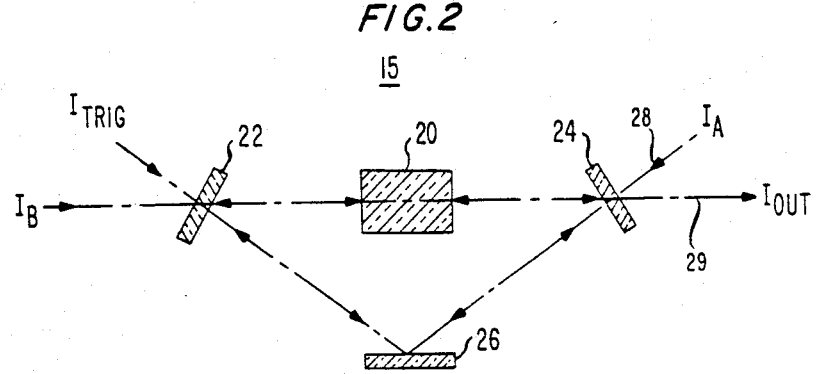
FIG. 2 illustrates an exemplary multiplexing element formed in accordance with the present invention.
Figure 3:
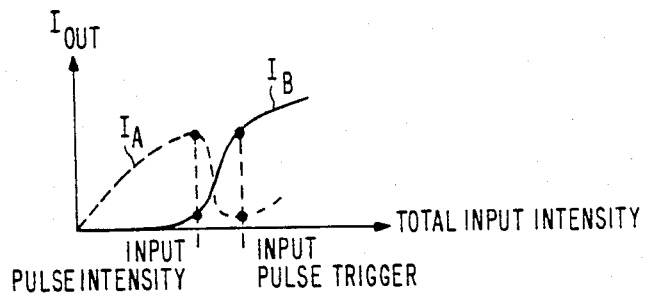
FIG. 3 illustrates the output characteristic of the exemplary elements shown in FIGS. 2 and 5.

An exemplary triggerable switching element 15 formed in accordance with the present invention is illustrated in FIG. 2. As shown, element 15 is in the form of a ring resonator, including a nonlinear optical material 20 and an arrangement of three mirrors 22, 24 and 26, together forming a nonlinear optical device 15 as illustrated in FIG. 2, where mirrors 22 and 24 are partially transmitting and mirror 26 is a total reflector. In accordance with the present invention, bistable nonlinear optical device 15 comprises a nonlinear material 20 whose refractive index is a function of the intensity of the light passing therethrough, and can be represented by the following equation:

$$n(I) = n_o + n_2 I. \quad (1)$$

where $n_o$ is the refractive index at zero intensity, $n_2$ is the nonlinear coefficient of nonlinear material 20, and I is the intensity of light within material 20. The input/output characteristic of nonlinear optical device 15 is illustrated in FIG. 3 to aid in the explanation of the operation of the present invention.

Referring to FIG. 2, a pulse A travels along path 28 and strikes mirror 24. The resonant frequency of the ring resonator, which is related to the refractive index of nonlinear optical material 20, is chosen such that a pulse from source A does not have sufficient intensity to tune the resonator to resonance, and essentially all of the pulse is reflected by mirror 24, and appears along output path 29 of the triggerable switching element. This reflectivity corresponds to the dashed-line portion of the graph of FIG. 3 labeled $I_A$, and it can be seen that at the input pulse intensity denoted on FIG. 3, essentially all of $I_A$ is reflected into $I_{out}$.

In accordance with the present invention, pulses A and B are interleaved in time at the input of the triggerable switching element such that when a pulse A is incident on nonlinear optical device 15, little intensity from pulse B is present.

The trigger pulse intensity $I_{trig}$ is applied simultaneously with the intensity $I_B$ from pulse B. When both of these pulses are present in nonlinear optical device 15, most of the input intensity $I_B$ appears in $I_{out}$ as shown by the solid line marked $I_B$ in FIG. 3. When $I_B$ and $I_{trig}$ are simultaneously incident on nonlinear device 15, the refractive index of nonlinear material 20 begins to increase in accordance with equation (1). A type of positive feedback begins to occur, since as the refractive index begins to increase, the resonator structure begins to "tune" the refractive index of the device towards the frequency of the light pulse B. Thus, more light from B builds up in the resonator formed by mirrors 24, 26, and 22, and further tunes the resonator towards the frequency of the pulses, resulting in the positive feedback. As shown in FIG. 3, this positive feedback causes the resonator structure to tune rapidly towards resonance. This results in transmission of the incident B which then appears in the output pulse stream.

In accordance with the present invention, the intensity-dependent nature of the refractive index of nonlinear optical material 20 functions to tune the length of the resonator by changing the effective length of the resonator. At the critical input intensity, the resonator switches from reflecting to transmitting. Thus, when the trigger signal is not applied, pulses A are reflected and appear in the output and when the trigger signal is applied pulses B are transmitted and appear in the output. It is to be noted that in order for a multiplexer to function in accordance with the present invention, the build-up time for light in the resonator must be short compared to the duration of the pulses being switched. For example, if the resonator build-up time were 10 picoseconds ($10^{-11}$ seconds), pulses longer than about 100 picoseconds ($10^{-10}$ seconds) would be properly switched.

Figure 4:
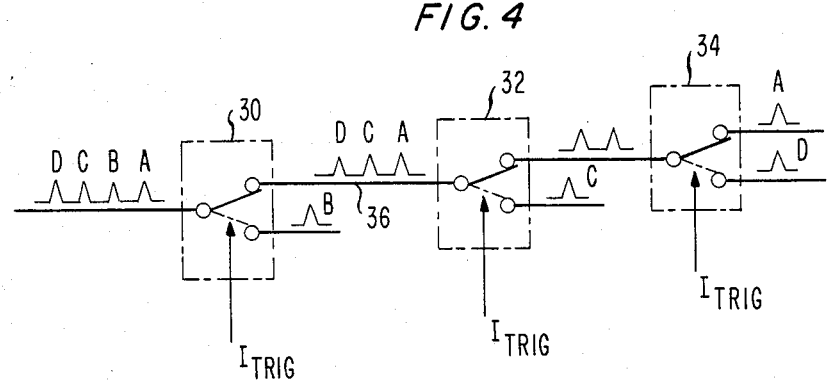
FIG. 4 illustrates the optical time-division demultiplexing function of the present invention.

In accordance with the present invention, the same procedure as described hereinafter may be utilized to demultiplex a train of optical pulses, where an exemplary demultiplexing arrangement is illustrated in FIG. 4. The incoming pulse train DCBA may have been constructed utilizing the above-described procedure. The pulse train enters a triggerable switching element 30, where element 30 is activated by an optical trigger pulse $I_{trig}$. As illustrated in FIG. 4, if $I_{trig}$ arrives simultaneously with pulse B, the presence of $I_{trig}$ activates switching element 30 so that pulse B is removed from the pulse train propagating along transmission path 36 and is directed to the destination for pulses B. The remainder of the pulse train propagates along transmission path 36 and is applied as an input to a second trigger element 32. Like element 30, trigger element 32 is activated by an optical pulse $I_{trig}$ where for element 32, $I_{trig}$ functions to switch the output from transmission path 36 when the trigger pulse coincides in time with one of the incident pulses. When the pulse $I_{trig}$ coincides with pulse C, pulse C is redirected to the destination which is to receive pulses C. Lastly, the remainder of the pulse train, consisting of pulses D and A is applied as an input to a third triggerable switching element 34. An optical trigger pulse $I_{trig}$ activates element 34 such that the two remaining optical pulses are directed to their correct destinations.

Figure 5:
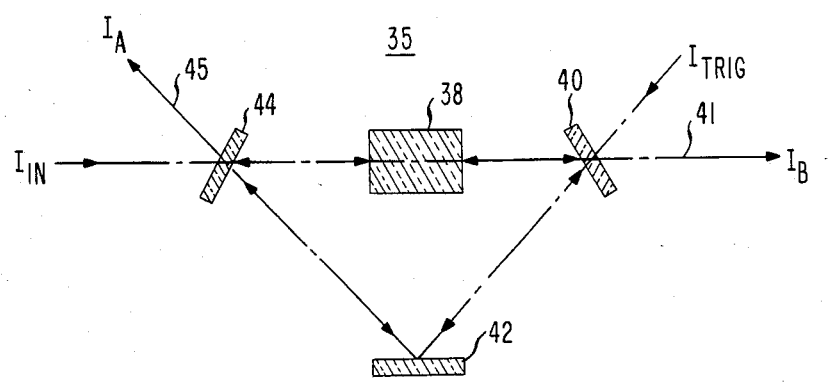
FIG. 5 illustrates an exemplary demultiplexing element formed in accordance with the present invention.

An exemplary switching element 35 which may be employed in the emultiplexer arrangement of FIG. 4 is illustrated in FIG. 5. Like element 15 illustrated in FIG. 2, an exemplary demultiplexer element 35 is in the form of a ring resonator and includes a nonlinear optical material 38 and an arrangement of three mirrors 40, 42 and 44, disposed as illustrated around nonlinear material 38, where mirrors 40 and 44 are partially transmitting and mirror 42 is a total reflector. Nonlinear optical material 38, like nonlinear material 20 of FIG. 2, in accordance with the present invention, consists of a material whose refractive index is a function of the intensity of the light passing therethrough, and can be represented by equation (1).

In operation of the exemplary switching element, an input optical pulse train, here denoted $I_{in}$, enters the exemplary arrangement via mirror 44. In the absence of a trigger pulse $I_{trig}$, the refractive index of device 38, in accordance with equation (1), is such that the pulse train does not have sufficient intensity to tune the resonator to resonance, and essentially all of the pulse is reflected by mirror 44, and appears along output path 45 of the triggerable switching element 35.

The trigger pulse $I_{trig}$ is applied simultaneously with input pulse train $I_{in}$ when, for example, pulse B is present. When both of these pulses are present in nonlinear material 38, the refractive index of nonlinear optical material 38 begins to increase, in accordance with equation (1). The above-described positive feedback effect begins to occur, and the resonant frequency of the device rapidly tunes toward the frequency of pulse B. Therefore, pulse B will pass through switching element 35 and appear along output signal path 41 of the triggerable switching element. As noted hereinbefore, in order for the switching element to function in accordance with the present invention, the build-up time for light in the resonator must be short compared to the duration of the pulses being switched.

In order for the present invention to operate as described above, a material is needed that comprises the nonlinear refractive index properties associated with equation (1). One such class of materials capable of operating in accordance with the present invention are multiple quantum well structures (MQWS) formed with alternating layers of GaAs and GaAlAs. These MQWS have an $n_2$ large enough so that laser diodes have enough power output to be utilized as the pulse sources. Therefore, an optical multiplexer or demultiplexer made with MQWS devices can be utilized in integrated optics applications. Other materials exist that possess an inherent nonlinear refractive index that will allow them to be utilized in accordance with the present invention. Certain materials, such as the liquid $CS_2$ will have very rapid response times, but such materials require much higher optical input power levels than MQWS devices.

What is claimed is:

1. An all optical switching element comprising nonlinear optical means including a nonlinear material with a refractive index of the form $n(I) = n_o + n_2 I$, where $n_o$ is a constant refractive index and I is the intensity of an optical pulse within said nonlinear optical means, said nonlinear optical means responsive to a first and a second optical pulse stream and an optical trigger pulse stream for switching between said first and said second optical pulse streams as a function of the presence or absence of said trigger pulse stream in said nonlinear optical means.

2. An all optical switching element formed in accordance with claim 1 wherein the nonlinear optical means further comprises a ring resonator including a first and a second partially-transmitting mirror, and a third highly-reflective mirror disposed in relation to the nonlinear optical material such that said nonlinear optical material is disposed directly between said first and second partially-transmitting mirrors.

3. An all-optical switching element formed in accordance with claim 1 wherein said element further comprises
sequential optical triggering means capable of adjusting the arrival of an optical trigger pulse in the nonlinear material in a manner whereby said optical trigger pulse and an optical pulse from the second optical stream arrive simultaneously at said nonlinear material.

4. An all-optical switching element formed in accordance with claim 2 wherein the ring resonator exhibits a build-up time which is less than the pulse width of a pulse from the first or the second optical pulse stream.

5. An all optical multiplexer for time-division multiplexing a plurality of optical pulse streams from a plurality of separate optical sources, said multiplexer comprising a plurality of cascaded optical switching elements, each element comprising
nonlinear optical means including a nonlinear material with a refractive index of the form $n(I) = n_o + n_2 I$, where $n_o$ is a constant refractive index and I is the intensity of an optical pulse within said nonlinear optical means, said nonlinear optical means responsive to a first and a second optical pulse stream and an optical trigger pulse stream for switching between said first and said second optical pulse streams as a function of the presence or absence of said optical trigger pulse stream in said nonlinear optical means.

6. An all optical multiplexer formed in accordance with claim 5 wherein each nonlinear optical means further comprises a ring resonator including a first and a second partially-transmitting mirror and a third highly-reflective mirror disposed in relation to the nonlinear optical material such that said nonlinear optical material is disposed directly between said first and second partially-transmitting mirrors.

7. An all-optical multiplexer formed in accordance with claim 5 where said all-optical multiplexer further comprises
sequential optical triggering means capable of adjusting the arrival of an optical trigger pulse in each nonlinear material included in each cascaded nonlinear optical means forming said all-optical multiplexer in a manner whereby said optical trigger pulse and an optical pulse from an external optical pulse stream arrive simultaneously at each nonlinear material in a manner whereby said optical pulse stream is time-division multiplexed at the output of said optical multiplexer.

8. An all-optical multiplexer formed in accordance with claim 6 wherein each ring resonator exhibits a build-up time which is less than the pulse width of a pulse from an associated first or second optical pulse stream.

9. An all optical demultiplexer for time-division demultiplexing optical pulses from an input optical stream, said demultiplexer comprising a plurality of cascaded optical switching elements, each element comprising
nonlinear optical means including a nonlinear material with a refractive index of the form $n(I) = n_o + n_2 I$, where $n_o$ is a constant refractive index and I is the intensity of an optical pulse within said nonlinear optical means, said nonlinear optical means responsive to a first and a second optical pulse stream and an optical trigger pulse stream for switching between said first and said second optical pulse streams as a function of the presence or absence of said optical trigger pulse stream in said nonlinear optical means.

10. An all optical demultiplexer formed in accordance with claim 9 wherein each nonlinear optical means further comprises a ring resonator including a first and a second partially-transmitting mirror, and a third highly-reflective mirror disposed in relation to the nonlinear optical material such that said nonlinear optical material is disposed directly between said first and second partially-transmitting mirrors.

11. An all-optical demultiplexer formed in accordance with claim 9 wherein said all-optical demultiplexer further comprises
sequential optical triggering means capable of adjusting the arrival of an optical trigger pulse in each nonlinear material included in each cascaded nonlinear optical means forming said all-optical demultiplexer in a manner whereby said optical trigger pulse and an optical pulse from an external optical pulse stream arrive simultaneously at each nonlinear material in a manner whereby said pulse stream is time-division demultiplexed at the output of said optical demultiplexer.

12. An all-optical demultiplexer formed in accordance with claim 10 wherein each ring resonator exhibits a build-up time which is less than the pulse width of a pulse from an associated first or second pulse stream.

* * * * *